(12) United States Patent
Schaefer et al.

(10) Patent No.: US 11,698,477 B2
(45) Date of Patent: Jul. 11, 2023

(54) VISIBLE QUALITY ADDITIVE MANUFACTURED ALUMINUM MIRROR FINISHING

(71) Applicant: Raytheon Company, Waltham, MA (US)

(72) Inventors: John P. Schaefer, Plano, TX (US); Paul Gasloli, Richardson, TX (US)

(73) Assignee: RAYTHEON COMPANY, Waltham, MA (US)

( * ) Notice: Subject to any disclaimer, the term of this patent is extended or adjusted under 35 U.S.C. 154(b) by 373 days.

(21) Appl. No.: 16/929,177

(22) Filed: Jul. 15, 2020

(65) Prior Publication Data
US 2022/0019002 A1 Jan. 20, 2022

(51) Int. Cl.
| | |
|---|---|
| *G02B 5/08* | (2006.01) |
| *B33Y 70/10* | (2020.01) |
| *B33Y 80/00* | (2015.01) |
| *B32B 15/20* | (2006.01) |
| *B32B 18/00* | (2006.01) |
| *B32B 7/023* | (2019.01) |
| *B32B 7/12* | (2006.01) |
| *B33Y 40/20* | (2020.01) |
| *B32B 15/01* | (2006.01) |
| *C22C 21/02* | (2006.01) |
| *B32B 38/00* | (2006.01) |

(52) U.S. Cl.
CPC ............ *G02B 5/0808* (2013.01); *B32B 7/023* (2019.01); *B32B 7/12* (2013.01); *B32B 15/017* (2013.01); *B32B 15/20* (2013.01); *B32B 18/00* (2013.01); *B33Y 40/20* (2020.01); *B33Y 70/10* (2020.01); *B33Y 80/00* (2014.12); *C22C 21/02* (2013.01); *B32B 2038/0064* (2013.01); *B32B 2307/416* (2013.01); *B32B 2307/536* (2013.01); *B32B 2310/08* (2013.01); *B32B 2551/08* (2013.01)

(58) Field of Classification Search
CPC ..... G02B 5/0808; B32B 15/017; B33Y 70/10; B33Y 80/00; C22C 21/02
See application file for complete search history.

(56) References Cited

U.S. PATENT DOCUMENTS

| | | | | |
|---|---|---|---|---|
| 6,921,177 B2 * | 7/2005 | Schaefer | ............. | G02B 5/0808 359/884 |
| 9,575,223 B2 | 2/2017 | Schaefer et al. | | |
| 2015/0293275 A1 * | 10/2015 | Crifasi | ................ | G02B 5/0808 428/673 |
| 2017/0292174 A1 * | 10/2017 | Karabin | ............... | B23K 26/342 |

FOREIGN PATENT DOCUMENTS

WO WO-2020081157 A1 * 4/2020

* cited by examiner

*Primary Examiner* — Frank J Vineis
*Assistant Examiner* — Donald M Flores, Jr.
(74) *Attorney, Agent, or Firm* — Cantor Colburn LLP

(57) ABSTRACT

A mirrored apparatus includes a substrate having a surface and including an additive manufactured aluminum and about 2 to about 30 weight % (wt. %) silicon. The mirrored apparatus also includes a finish layer arranged directly on the surface of the substrate. The finish layer includes a polished surface opposite the substrate. The mirrored apparatus further includes a reflective layer arranged on the polished surface of the finish layer.

6 Claims, 3 Drawing Sheets

US 11,698,477 B2

VISIBLE QUALITY ADDITIVE MANUFACTURED ALUMINUM MIRROR FINISHING

BACKGROUND

A variety of optical systems include high precision mirrors. Non-limiting examples of such applications include systems with ultraviolet lithography condenser mirrors, systems with reflective laser scanner mirrors, exo-atmospheric reflecting optics, and systems in which low scattering is needed for visible wavelength applications.

One technique for making precision metal mirrors is to take a substrate of an aluminum alloy, such as aluminum 6061-T6, and to carry out single point diamond turning (DPT) of a surface on the substrate, which then serves as the reflective surface. Aluminum 6061-T6 alloys are lightweight, easily machined by DPT, and have desirable long-term stability.

SUMMARY

According to one or more embodiments of the present invention, a mirrored apparatus includes a substrate having a surface and an additive manufactured aluminum and about 2 to about 30 weight % (wt. %) silicon. The mirrored apparatus also includes a finish layer arranged directly on the surface of the substrate. The finish layer includes a polished surface opposite the substrate. The mirrored apparatus further includes a reflective layer arranged on the polished surface of the finish layer.

According to other embodiments of the present invention, a mirrored apparatus includes a substrate having a surface and an additive manufactured aluminum and about 2 to about 30 wt. % silicon. The mirrored apparatus also includes a binding layer arranged on the surface of the substrate and a finish layer arranged on the binding layer. The finish layer has a polished surface opposite the substrate. The mirrored apparatus further includes a reflective layer arranged on the polished surface of the finish layer.

Yet, according to other embodiments of the present invention, a method of making a mirrored apparatus includes forming, using additive manufacturing, a substrate having a surface and aluminum and about 2 to about 30% wt. % silicon. The method further includes depositing a finish layer on the surface of the substrate and polishing a surface of the finish layer opposite the substrate. The method also includes depositing a reflective layer on the surface of the finish layer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
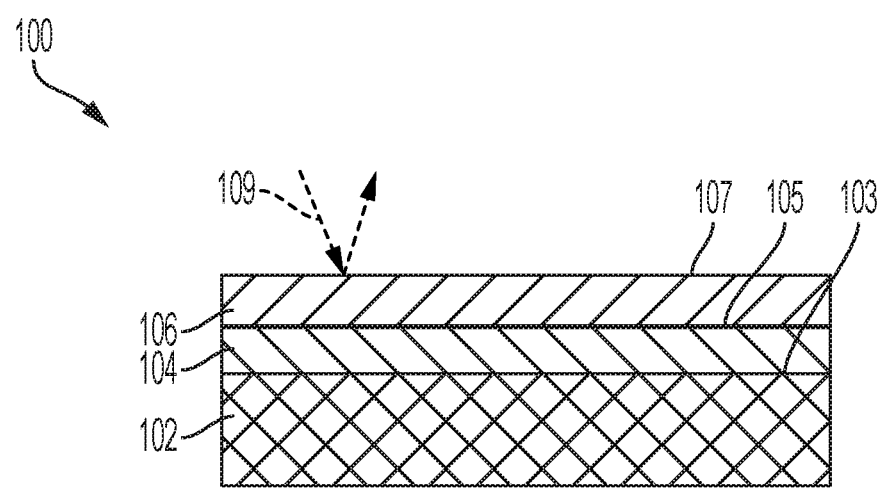
FIG. 1 depicts a fragmented cross-sectional side view of a mirror according to aspects of the present invention.

Although aluminum 6061-T6 has many desirable properties for use in high precision mirrors, this aluminum alloy contains alloy elements, such as zinc, chromium, and iron, which leave defects or artifacts after DPT that effectively limit the surface finish achievable with DPT to approximately 80 Angstroms RMS. A surface finish of this quality provides adequately low scatter for many applications where the reflected radiation of interest has a relatively long wavelength, such as a wavelength greater than 3 micrometers. At shorter wavelengths, however, such as the wavelength of visible radiation, a surface finish of 80 Angstroms RMS produces a level of scatter which is too high for many applications.

Previous attempts to address these challenges have disadvantages. For example, plating electroless nickel over the DPT surface of the aluminum 6061-T6 substrate, subjecting the nickel layer to DPT, and then post-polishing the nickel layer to improve the surface finish has disadvantages because there is an inherent mismatch between the coefficient of thermal expansion (CTE) for the aluminum alloy substrate and the plated nickel layer. Consequently, and in particular due to the thickness of the nickel layer, there can be a bimetallic effect between the substrate and nickel layer, which causes bending of the mirror surface across the operational temperature range of the mirror. Such bending is undesirable in the context of a high precision mirror surface, because it changes optical characteristics of the mirror surface. In order to keep such bimetallic bending to an acceptable level over normal temperature variations, the plated nickel must be a thin and uniform layer with a thickness of approximately 0.0005 inch to approximately 0.001 inch. In order to achieve this thin and uniform layer, the above-mentioned DPT operation is needed, in addition to the DPT operation for the aluminum. The need for this second DPT operation added cost and cycle time to the fabrication process.

Another technique to address the challenges of aluminum 6061-T6 uses electro-deposited high purity aluminum plating instead of the nickel plating, in order to avoid the thermal mismatch. However, this process creates a hard aluminum oxide (sapphire) outer layer on the electro-deposited aluminum layer that damages the diamond tool during cutting. In addition, the plated high purity aluminum is very soft, and tends to build up on the diamond tool during cutting, which makes the DPT operation difficult. Further, the soft aluminum surface is easily scratched and difficult to clean. Although the DPT surface finish is improved to around 40 Angstroms RMS, the grooves from the DPT are still present and create undesirable scatter at visible wavelengths.

Another method for improving surface finishes on 6061-T6 aluminum mirrors is to polish the aluminum. However, polishing the aluminum surface is challenging because of the softness of the aluminum. Although some techniques have demonstrated surface finishes of 10 Angstroms RMS, bi-directional reflective distribution function (BRDF) scatter testing shows that the resulting aspheric surface on the polished 6061-T6 aluminum layer effectively performs like a 60 Angstroms RMS surface finish because the surface peak-to-valley variations remain very high as a result of impurities. A surface that performs comparable to a 60 Angstroms RMS surface finish is not a significant improvement over an 80 Angstroms RMS surface finish, particularly provided the added difficulty and cost.

Turning now to an overview of the aspects of the invention, one or more embodiments of the invention address the above-described shortcomings by providing mirrored apparatuses and methods of making thereof that includes a substrate manufactured using with an additive manufactured aluminum and about 2 to about 30% silicon and a finish layer arranged on the surface of the substrate. The finish layer is polished on the surface opposite the substrate. The mirrored apparatuses further include a reflective layer on the polished surface of the finish layer. In some embodiments, the mirrored apparatuses include a binding layer between the substrate and the finish layer.

The present invention leverages the advantages of additive manufacturing and provides a number of technical advantages. The first advantage is increased mirror stiffness. To that end, additive manufacturing processes for optical mirrors have been invested in and refined for many years. Traditional aluminum diamond-point turned mirrors are challenging to manufacture because they lack stiffness. In order to minimize self-weight deflection (1G Sag) and increase the natural frequency of the mirror, designers must eliminate excess material from the outer edges of the mirror. However, it is challenging to eliminate excess material, while simultaneously keeping the design compatible with Computer Numerical Control (CNC) machining. The mirrors are typically light-weighted on the backside, which helps reduce mass, but reduces the overall stiffness of the mirror, and leaves it prone to deformation forces during manufacturing caused by centrifugal, tool push off, and bolt-up stresses. Additive manufacturing now frees the designer from the constraints of CNC machining and enables a backside skin that significantly improves the overall mirror stiffness for increased system performance and improved manufacturability.

Another advantage involves the provision of a mirrored apparatus having a reflective surface with a high degree of smoothness, for example in the range of about 10 to 25 Angstroms RMS, depending on the specific structure of the mirror. This degree of smoothness is particularly advantageous when the mirror is used for radiation with relatively short wavelengths less than about 3 microns, such as visible radiation that is between about 0.4 and 0.7 micrometers (microns).

A further advantage is that such a mirrored apparatus is fabricated with from an additive manufactured aluminum substrate, which includes less metal alloy elements, such as iron, zinc, and chromium, as well as a much lower percentage of trace elements, which provides less diamond tool wear. The additive manufactured aluminum also includes a higher percentage of silicon, which enables laser sintering and provides properties closer to cast aluminum. The mirrored apparatus is thus easier and cheaper to make than pre-existing mirrors and can be made using non-traditional shapes and configurations to help optimize stiffness and improve the overall mirror performance.

Another advantage is that, by finishing the surface of the finish layer using a polishing operation rather than diamond point turning, the finish layer can be a thin-film layer which is sufficiently thin so that the finish layer and the substrate do not exhibit a bi-metallic effect that causes bending of the mirror in response to temperature variations. Still another advantage is that the single diamond point turning operation and the formation of the various thin-film layers can be carried out using known equipment and techniques, thereby avoiding the need for development and/or purchase of custom manufacturing equipment.

Turning now to a more detailed description of aspects of the present invention, FIG. 1 depicts a fragmented cross-sectional side view of a mirror 100 (also referred to herein as a mirrored apparatus) according to aspects of the present invention. The mirror 100 has a high-precision surface 107 that can reflect radiation, as indicated diagrammatically by broken-line arrows 109. The mirror 100 of FIG. 1 is designed for use with visible radiation but could alternatively be used with other types of radiation. The surface 107 is an aspheric surface, although the portion of the mirror 100 that is visible in FIG. 1 is sufficiently small so that the curvature of the surface 105 is not apparent in FIG. 1. The invention has aspects which are advantageous in the context of an aspheric mirror surface, such as the surface 107, but the invention is not limited to aspheric surfaces.

The mirror 100 has a substrate 102, which includes an additive manufactured aluminum material. Any additive manufacturing process can be used. A non-limiting example of a suitable additive manufacturing process includes Direct Laser Metal Sintering (DMLS), in which a laser melts powdered metal material to build up the mirror structure layer by layer. Using DMLS is advantageous because it can be used to create closed back hollow mirror substrates that are much stiffer than traditional open back Computer Numerical Control (CNC) aluminum mirrors.

Compared to aluminum 6061-T6, the additive manufactured aluminum includes less metal alloy elements, such as iron, zinc, and chromium, as well as a much lower percentage of trace elements, which provides less diamond tool wear and improved refined aluminum material. The additive manufactured aluminum also includes a higher percentage of silicon, which enables laser sintering and provides properties closer to cast aluminum.

According to one or more aspects of the present invention, the substrate 102 includes additive manufactured aluminum with about 2 to about 30 weight % (wt. %) silicon. In other aspects of the present invention, the substrate 102 includes additive manufactured aluminum with about 8 to about 12 wt. % silicon. Yet, in some aspects of the present invention, the substrate 102 includes additive manufactured aluminum with silicon in an amount or in any range from about 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %.

In some aspects of the present invention, the additive manufactured aluminum further comprises a ceramic material. The ceramic material is an inorganic, non-metallic, often crystalline oxide, nitride, or carbide material. Ceramic materials are brittle, hard, strong in compression, and weak in shearing and tension. Ceramic materials withstand chemical erosion that occurs in other materials subjected to acidic or caustic environments, as well as very high temperatures. Non-limiting examples of ceramic materials include oxides (e.g., aluminum oxide, silicon oxide, titanium oxide, or tungsten oxide), nitrides (e.g., silicon nitride), carbides (e.g., silicon carbide), or any combination thereof.

In one or more aspects of the present invention, the ceramic material is present in the additive manufactured aluminum in an amount of about 1.5 to about 15 wt. %. In other aspects of the present invention, the ceramic material is present in the additive manufactured aluminum in an amount about or in any range from about 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, or 15.0 wt. %.

In one or more aspects of the present invention, the substrate 102 consists of, or consists essentially of the additive manufactured aluminum. Yet, in other aspects, the substrate 102 consists of or consists essentially of the additive manufactured aluminum and the ceramic material(s).

The substrate 102 has a surface 103 thereon. The surface 103 is a precision surface formed using a machining technique which is commonly referred to in the industry as single point diamond turning (DPT), but could also be ground, lapped, or polished using optical manufacturing methods common in the trade.

A finish layer 104 is deposited on the surface 103 of the substrate 102 using a thin-film vapor deposition technique. Non-limiting examples of thin film deposition methods include chemical vapor deposition (CVD), physical vapor deposition (PVD), atomic layer deposition (ALD), dual ion beam sputtering (DIBS), and magnetron sputtering.

The finish layer 104 is an inorganic material. Non-limiting examples of materials for the finish layer 104 include silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

The thickness of the finish layer 104 varies depending on the type of material, substrate 102, and particular application in which the mirror 100 is used. According to some aspects of the present invention, the finish layer 104 has a thickness of about 1 micrometer to about 20 micrometers. According to other aspects of the present invention, the finish layer 104 has a thickness of about 1 to about 10 micrometers. Yet, according to other aspects of the present invention, the finish layer 104 has a thickness of about 1 to about 2 micrometers.

The finish layer 104 is radiation hardened. As used herein, "radiation hardened" means that the finish layer does not blister, peel, crack, or melt after being exposed to at least a 30 megarads total ionizing dose, at least a $1.43 \times 10^{13}$ neutrons/cm$^2$ (1 MeV equivalent) displacement damage dose, or a combination thereof.

The finish layer 104 has a surface 105 on a side thereof opposite from the substrate 102. The surface 105 is initially somewhat rough because the finish layer 104 is a thin-film layer, and thus its upper surface will conform to some degree to the contour of the surface 103 on the substrate 102, which as mentioned above will have some defects or artifacts. Therefore, in order to remove peak-to-valley variations in the surface 105, the surface 105 is polished.

Polishing of the surface 105 is carried out using a polishing compound and a polishing element or pad. The polishing compound is a material available commercially under the tradename K-SPRAY DIAMOND ABRASIVE, type SJK-5, size 0.0-0.2 micrometers, formula K-285T. However, any other suitable material could alternatively be used as the polishing compound. The polishing element is a part available commercially under the tradename TAC'N STIK REUSABLE ADHESIVE. However, any other suitable element could alternatively be used as the polishing element. Additionally, a final figure correction polishing process could be used to improve the overall shape of the mirror using commercially available CNC polishing equipment or other methods such as ion beam figuring (IBF).

According to some aspects of the present invention, polishing the surface 105 removes approximately 500 Angstroms of the material of the finish layer 104. After polishing, the resulting surface 105 has a surface finish of approximately 10 to 25 Angstroms RMS, but could be less than 10 Angstroms RMS.

A thin reflective layer 106 is then formed on the surface 105 of the finish layer 104 using a thin-film vapor deposition technique. Non-limiting examples of thin film deposition methods include CVD, PVD, ALD, DIBS, and magnetron sputtering.

According to one or more aspects of the present invention, the reflective layer 106 has a thickness of about 2,000 to about 5,000 Angstroms, but it could alternatively have any other suitable thickness that depends on the type of material and particular application. Non-limiting examples of materials for the reflective layer 106 include silver, gold, aluminum, or any combination thereof. The outer surface of the reflective layer 106 serves as the reflective surface 107. Since the reflective layer 106 is a thin-film layer provided on the surface 105 of the underlying finish layer 104, the surface 107 on the reflective layer 106 has a surface finish comparable to that of the surface 105 of the finish layer 104, or in other words a surface finish of approximately 10 to 25 Angstroms RMS.

A thin overcoat, which is not shown in the drawings, may be applied over the reflective layer 106 to protect the reflective layer 106 and/or to increase the reflectance within a selected waveband. For example, if the mirror 100 was intended for use with radiation in the visible and near infrared wavebands, an overcoat of silicon dioxide (SiO$_2$) with a thickness of about 1,500 Angstroms could be applied over the reflective layer 21 using well-known techniques. However, there is a wide variety of other known materials that, depending on the particular intended use for the mirror 100, could alternatively be used for the overcoat, including but not limited to silicon oxide, tantalum oxide, titanium oxide, zirconium oxide, or any combination thereof.

Figure 2:
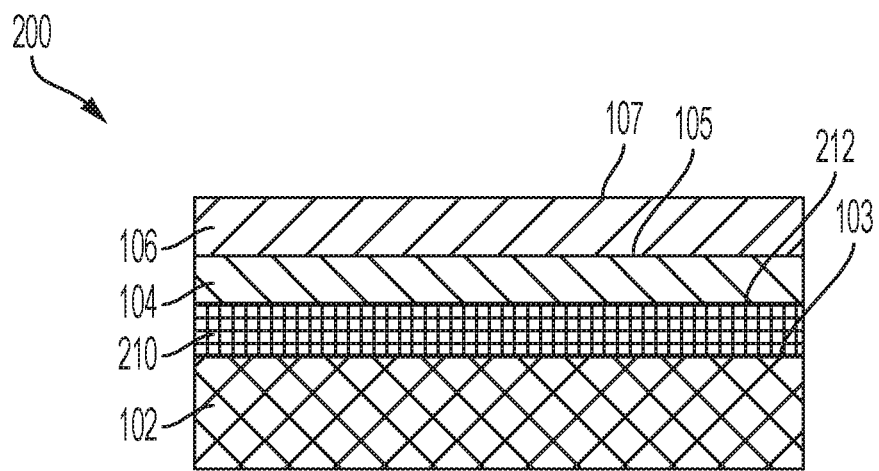
FIG. 2 depicts a fragmented cross-sectional side view of a mirror according to aspects of the present invention.

FIG. 2 depicts a fragmented cross-sectional side view of a mirror 200 (a mirrored apparatus) according to aspects of the present invention, which is similar to FIG. 1 but shows another aspect with a binding layer 210 arranged between the substrate 102 and the finish layer 104. More specifically, the surface 103 on the substrate 102 is finished, as discussed above in association with FIG. 1. Then, the binding layer 210 is deposited on the surface 103 of the substrate 102 using thin-film vapor deposition techniques.

Non-limiting examples of materials for the binding layer 210 include titanium, nickel, nickel chromium, chromium, gold, aluminum, molybdenum, germanium, zinc sulfide, or any combination thereof. The binding layer 210 has a thickness of about 100 to about 3000 Angstroms but could alternatively have some other suitable thickness. According to one or more aspects of the present invention, the binding layer 210 has a thickness that is greater than 100 Angstroms, or greater than 1000 Angstroms.

The finish layer 104 is then deposited on the surface 212 of the binding layer 210, using thin-film vapor deposition techniques, in the manner described above in association with FIG. 1.

The purpose of the binding layer 210 is improve adherence between the surface of the additive aluminum substrate 102 and the finish layer 104. Spatter from the additive laser sintering process can create unwanted aluminum and magnesium oxide defects that can cause surface quality defects, such as pinholes and pullouts, during subsequent finishing operations. Since the finish layer 104 is a thin-film layer, it will also benefit from the hardness of the binding layer 210. In particular, when the surface 105 of the finish layer 104 in FIG. 2 is polished in the same manner described above in association with FIG. 1, the presence of the intermediate binding layer 210 below the finish layer 104 will allow the surface 105 to have a higher degree of smoothness and better surface quality in the mirror 200 of FIG. 2 than in the mirror 100 of FIG. 1. In particular, the surface 105 in FIG. 2 will have a surface finish of approximately 10 to 15 Angstroms RMS.

Figure 3:
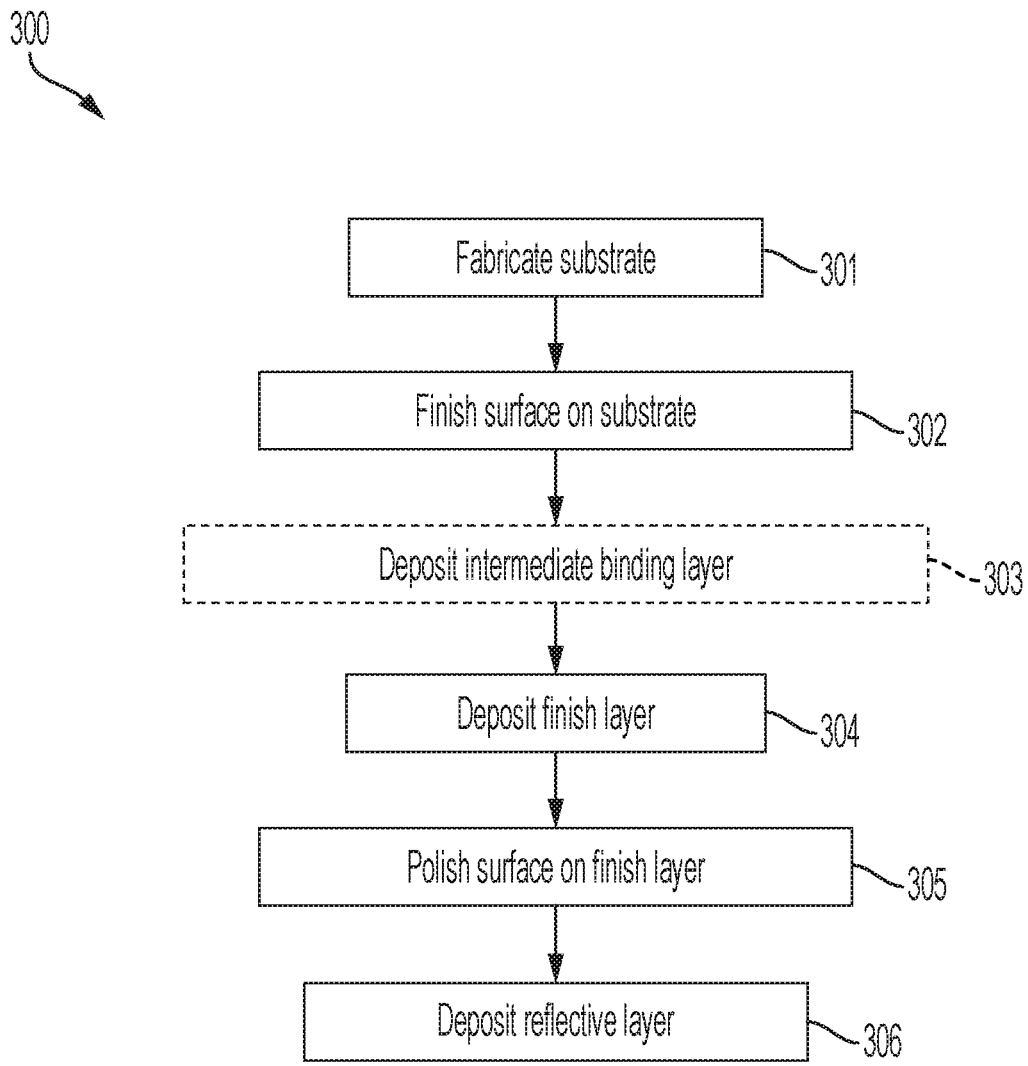
FIG. 3 is a flowchart showing a process that can be used to make mirrors according to aspects of the present invention.

FIG. 3 is a flowchart showing a process which can be used to fabricate each of the mirrors 100, 200 (mirrored apparatuses) of FIGS. 1 and 2. The process begins at block 301, where the substrate 102 is fabricated. As discussed above, the substrate 102 in each disclosed embodiment is made from an additive manufactured aluminum. At block 302, the surface 103 on the substrate 102 is finished using DPT, but could also be ground, lapped, or polished using optical manufacturing methods common in the trade.

Block 303 is shown in broken lines in FIG. 3 to indicate that block 303 is carried out during fabrication of the mirror 200 of FIG. 2 but is not carried out during fabrication of the mirror 100 of FIG. 1. In block 303, the binding layer is formed on the surface 103 of the substrate 102, using thin-film vapor deposition techniques.

In block 304, the finish layer 104 is formed using thin-film vapor deposition techniques. As discussed above, non-limiting examples of the finish layer 104 include silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combinations thereof.

In block 305, the surface 105 of the finish layer 104 is polished in the manner explained above. This yields a surface finish of approximately 10 to 25 Angstroms RMS, depending on the type of materials used and whether an intermediate binding layer is present.

In block 306, the thin reflective layer 106 is formed over the surface 105 of the finish layer 104 using thin-film vapor deposition techniques. As discussed above, the reflective layer 106 can be silver, gold, or aluminum, for example.

EXAMPLE

Table 1 below shows a compositional analysis of AL6061-T6 and an additive manufactured aluminum powder AlSi$_{10}$Mg, the standard industry powder used in to DMLS processing. As discussed above, the finish product will contain aluminum and magnesium oxides due to spatter from the melting process.

TABLE 1

Compositions of Al6061-T6 and additive manufactured aluminum AlSi$_{10}$Mg

|  | AL60601-T6 | AM Powder AlSi$_{10}$Mg |
| --- | --- | --- |
| Chromium (Cr) | 0.040-0.35 wt. % | — |
| Copper (Cu) | 0.15-0.40 wt. % | ≤0.05 wt. % |
| Iron (Fe) | ≤0.70 wt. % | ≤0.55 wt. % |
| Lead (Pb) | — | ≤0.05 wt. % |
| Magnesium (Mg) | 0.80-1.20 wt. % | 0.2-0.45 wt. % |
| Manganese (Mn) | ≤0.15 wt. % | ≤0.45 wt. % |
| Nickel (Ni) | — | ≤0.05 wt. % |
| Silicon (Si) | 0.40-0.80 wt. % | 9.0-11 wt. % |
| Tin (Sn) | — | ≤0.05 wt. % |
| Titanium (Ti) | ≤0.15 wt. % | ≤0.15 wt. % |
| Zinc (Zn) | ≤0.25 wt. % | ≤0.10 wt. % |

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A mirrored apparatus comprising:
   a substrate having a surface and comprising an additive manufactured aluminum and about 2 to about 3 wt. % silicon;
   a binding layer arranged on the surface of the substrate, wherein the binding layer is titanium, nickel, nickel chromium, chromium, gold, aluminum, molybdenum, germanium, zinc sulfide, or any combination thereof;
   a finish layer arranged on the binding layer, the finish layer having a polished surface opposite the substrate; and
   a reflective layer arranged on the polished surface of the finish layer.

2. The mirrored apparatus of claim 1, wherein the additive manufactured aluminum comprises an oxide, a nitride, a carbide material, or any combination thereof.

3. The mirrored apparatus of claim 1, wherein the additive manufactured aluminum further comprises aluminum oxide, silicon oxide, titanium oxide, tungsten oxide, magnesium oxide, silicon carbide, silicon nitride, or any combination thereof.

4. The mirrored apparatus of claim 1, wherein the finish layer is silicon, chromium, nickel chromium, germanium, silicon carbide, silicon nitride, aluminum oxide, indium tin oxide, silicon monoxide, aluminum oxide, zirconium oxide, silicon oxide, titanium pentoxide, hafnium oxide, silicon aluminum oxide, or any combination thereof.

5. The mirrored apparatus of claim 1, wherein the finish layer is radiation hardened and does not blister, peel, crack, or melt after being exposed to at least a 30 megarads total ionizing dose, at least a $1.43 \times 10^{13}$ neutrons/cm$^2$ (1 MeV equivalent) displacement damage dose, or a combination thereof.

6. The mirrored apparatus of claim 1, wherein the finish layer has a thickness of about 1 to about 20 micrometers.

* * * * *